(12) United States Patent
Geiter

(10) Patent No.: US 8,442,702 B2
(45) Date of Patent: May 14, 2013

(54) FAULT DIAGNOSIS DEVICE AND METHOD FOR OPTIMIZING MAINTENANCE MEASURES IN TECHNICAL SYSTEMS

(75) Inventor: Denis Geiter, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 568 days.

(21) Appl. No.: 12/603,801

(22) Filed: Oct. 22, 2009

(65) Prior Publication Data
US 2010/0100259 A1    Apr. 22, 2010

Related U.S. Application Data

(60) Provisional application No. 61/107,554, filed on Oct. 22, 2008.

(51) Int. Cl.
*G01C 23/00* (2006.01)
(52) U.S. Cl.
USPC ............................................................ 701/3
(58) Field of Classification Search ............ 701/3, 30.2, 701/30.8, 30.9, 31.1; 702/181, 184; 706/52, 706/913
See application file for complete search history.

(56) References Cited

U.S. PATENT DOCUMENTS

| | | | | |
|---|---|---|---|---|
| 4,649,515 A | * | 3/1987 | Thompson et al. | 706/52 |
| 4,943,919 A | * | 7/1990 | Aslin et al. | 701/3 |
| 5,099,436 A | * | 3/1992 | McCown et al. | 702/82 |
| 7,634,329 B2 | * | 12/2009 | Liu et al. | 700/292 |
| 7,809,527 B2 | * | 10/2010 | Bailly et al. | 702/184 |
| 7,865,278 B2 | * | 1/2011 | Underdal et al. | 701/31.8 |
| 8,126,597 B2 | * | 2/2012 | Bailly et al. | 701/3 |
| 8,140,298 B2 | * | 3/2012 | Bordry | 702/185 |
| 2004/0078123 A1 | * | 4/2004 | Igloi et al. | 701/29 |
| 2005/0028033 A1 | * | 2/2005 | Kipersztok et al. | 714/27 |
| 2006/0074558 A1 | * | 4/2006 | Williamson et al. | 701/213 |
| 2006/0142976 A1 | * | 6/2006 | Bonanni et al. | 702/189 |
| 2006/0212281 A1 | * | 9/2006 | Mathews et al. | 703/7 |
| 2007/0293998 A1 | * | 12/2007 | Underdal et al. | 701/29 |
| 2009/0055339 A1 | * | 2/2009 | Bernard | 706/46 |

OTHER PUBLICATIONS

German Office Action from DE 10 2008 043 100 dated Jun. 17, 2009.

* cited by examiner

*Primary Examiner* — Helal A Algahaim
(74) *Attorney, Agent, or Firm* — Jenkins, Wilson, Taylor & Hunt, P.A.

(57) ABSTRACT

The present invention provides a fault diagnosis device for optimizing maintenance measures in a system, in particular a flying object. The diagnosis device has a storage unit for storing diagnosis rules, which each have a fault condition indicating the presence of a fault, and a fault conclusion formed by logical combinations of potential fault causes of the respective fault. Furthermore, a logic unit is provided, which logically combines those stored fault conclusions whose associated fault conditions are met and, on the basis of the combined fault conclusions, determines a logical diagnosis result having at least one fault cause hypothesis. A calculation unit subsequently calculates an occurrence probability for each fault cause hypothesis of the logical diagnosis result determined.

18 Claims, 9 Drawing Sheets

FIG 6

| Observing unit | BITE | Fault condition | Fault conclusion |
|---|---|---|---|
| C1 | Application BITE | No data from L1 and L2 | R1 or W1 or W2 or (L1 and L2) or (W7 and W8) |
| C2 | Application BITE | No data from L1 and L2 | R1 or W3 or W2 or (L1 and L2) or (W7 and W8) |
| C3 | Application BITE | No data from L1 | R1 or L1 or W7 or W4 or W5 |
| C1 | Resource BITE | No data from R1 | R1 or W1 or W2 |
| C2 | Resource BITE | No data from R1 | R1 or W2 or W3 |
| C3 | Resource BITE | No data from R1 | R1 or W4 or W5 |

2A

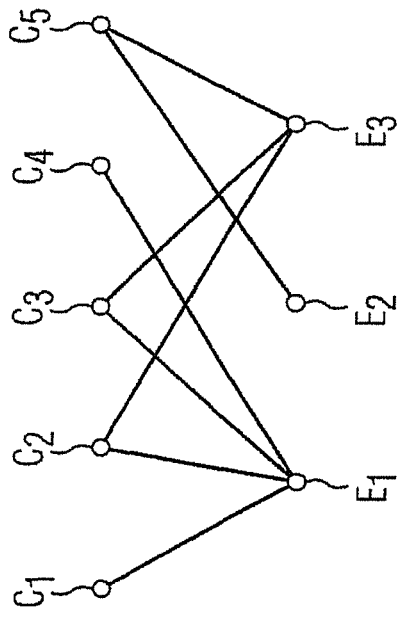

FAULT DIAGNOSIS DEVICE AND METHOD FOR OPTIMIZING MAINTENANCE MEASURES IN TECHNICAL SYSTEMS

CROSS-REFERENCE TO RELATED APPLICATIONS

This application claims the benefit of U.S. Provisional Application No. 61/107,554 filed Oct. 22, 2008, the entire disclosure of which is herein incorporated by reference.

The invention relates to a fault diagnosis device and to a method for optimizing maintenance measures in technical systems, for example vehicles, ships, machines, computers, robots, automatic apparatuses, industrial installations and in particular aircraft. The invention is explained below on the basis of the example of an aircraft.

TECHNICAL BACKGROUND

A flying object, for example an aeroplane or a helicopter, comprises a multiplicity of components or structural parts which are in part networked together. These aircraft components can be for example actuators, sensors, data lines or power lines, data communication units and data processing units, for example computers or servers. These structural components of the aircraft are in part replaceable and are referred to as LRU components (line replaceable units). Such LRU units are connected to data processing units or computing units via data lines or busses. A flying object, for example a passenger aircraft, can have a multiplicity of different aircraft systems. Examples of such flight systems are the undercarriage, the air-conditioning system or a pressure regulating system. Each flight system can have one or more control computers. Such control computers are also referred to as CPIOM units (Central Processing Input Output Module). For safety reasons, a plurality of control computers are provided in many aircraft systems in order that the aircraft system has a certain redundancy with respect to failures. Programs for carrying out the control procedures are executed on the control computers of the different aircraft systems.

The different components of the different aircraft systems can have faults during flight operation. In this case, a fault is a deviation from a normal function of the respective aircraft system component. A fault occurs if the behaviour of a function deviates from a predefined behaviour. This is usually identified by comparing signal measurement results with threshold values or by a fault identification logic. The different aircraft system components can be monitored by monitoring programs or by electronic logic circuits.

If a fault event occurs during flight operation, firstly measures for restoring the failed or faulty function are implemented in order to ensure the safety of the flying object or aircraft, for example by the activation of redundant components. Furthermore, the pilot of the aircraft is warned of any malfunction, in particular upon the failure of a function, by means of a flight warning system of the aircraft, primarily upon failure of critical functions, such that the pilot can implement the necessary measures for ensuring the safety of the aircraft. In conventional systems, the occurrence of a fault event furthermore leads to the generation of fault messages that are transmitted via an on-board maintenance system of the aircraft in order to prepare repair measures for faulty components or faulty equipment.

This conventional procedure has some disadvantages, however. The number of predefined fault messages is limited and incomplete. By contrast, the number of possible fault events or fault event combinations for all potential fault causes within an aircraft can be very high. Owing to the high number of possible fault events, the number of possible fault event combinations rises exponentially, and therefore so does the number of necessary fault messages. Since the predefined fault messages and their link with the fault events are predefined or written by a developer, a considerable programming and configuration complexity arises. Furthermore, this conventional procedure offers no flexibility whatsoever during the operational time or flight operation.

Therefore, it is an object of the present invention to provide a fault diagnosis device and a method for optimizing maintenance measures in a system which allows faults that occur during operation to be evaluated flexibly in order to prepare and initiate maintenance measures with little outlay.

SUMMARY OF THE INVENTION

The invention provides a fault diagnosis device for optimizing maintenance measures in a technical system, for example an aircraft, comprising:
   a storage unit for storing diagnosis rules, which each have
      a fault condition indicating the presence of a fault, and a
      fault conclusion formed by logical combinations of
      potential fault causes of the respective fault;
   a logic unit, which logically combines those stored fault
      conclusions whose associated fault conditions are met
      and, on the basis of the combined fault conclusions,
      determines a logical diagnosis result having at least one
      fault cause hypothesis; and
   comprising a calculation unit, which calculates an occurrence probability for each fault cause hypothesis of the
      logical diagnosis result.

In one embodiment of the fault diagnosis device according to the invention, the calculation unit transmits the calculated occurrence probabilities of the fault cause hypotheses of the logical diagnosis result to a maintenance device via an interface.

In one possible embodiment, the maintenance device has a maintenance unit, which successively performs maintenance procedures, respectively provided with regard to a fault cause hypothesis of the diagnosis result, in a manner dependent on the calculated occurrence probabilities of the fault cause hypotheses until the fault is rectified.

In one embodiment of the fault diagnosis device according to the invention, the calculation unit sorts the fault cause hypotheses of the logical diagnosis result in accordance with the calculated occurrence probabilities of the fault cause hypotheses.

In one embodiment of the fault diagnosis device according to the invention, the fault diagnosis device is provided in an object of the system, for example a flying object.

In one embodiment of the fault diagnosis device according to the invention, some or all of the flying object components of the flying object or of the aircraft have an integrated fault diagnosis device.

In one possible embodiment, the diagnosis devices of flying object components or of apparatuses of the aircraft which are associated with the same aircraft system are networked together.

In one embodiment of the fault diagnosis device according to the invention, the fault diagnosis device transmits the calculated occurrence probabilities of the fault cause hypotheses to the maintenance device via a radio interface during flight operation of the flying object, said maintenance device being situated at a destination airport of the flying object in order to prepare maintenance measures.

This embodiment affords the advantage that maintenance measures can be prepared in a targeted manner at the destination airport during the flight operation of the flying object, such that the performance of the maintenance measures can be carried out rapidly after the aircraft or flying object has landed. The necessary maintenance time for the flying object or the aircraft is thereby minimized, such that no delay occurs particularly when the aircraft makes a stopover.

In one embodiment of the fault diagnosis device according to the invention, the logic unit logically ANDs the stored fault conclusions of the diagnosis rules with one another.

In one possible embodiment of the fault diagnosis device according to the invention, the logic unit automatically determines the logical diagnosis result by means of logical Boolean calculation specifications on the basis of the combined fault conclusions of the diagnosis rules.

In one embodiment of the fault diagnosis device according to the invention, the meeting of a fault condition of a diagnosis rule is detected by a fault detector of a flying object component within the flying object.

In one embodiment of the fault diagnosis device according to the invention, a diagnosis rule comprises logical combinations of flying object components which may have caused the fault.

In one embodiment of the fault diagnosis device according to the invention, for each fault cause in a hypothesis of the diagnosis at least one associated maintenance procedure is present, comprising a plurality of maintenance measures.

In one embodiment of the fault diagnosis device according to the invention, the maintenance procedures are performed by the maintenance unit in the order of the sorted occurrence probabilities of the associated fault cause hypotheses.

In one embodiment of the fault diagnosis device according to the invention, the potential fault causes each have a flying object component and a functional state of said flying object component.

In one embodiment of the fault diagnosis device according to the invention, the flying object components of the flying object have actuators, sensors, lines, data switching units and data processing units.

The invention further provides a method for optimizing maintenance measures in an object of a system, in particular a flying object, comprising the following steps:

providing diagnosis rules, which each have a fault condition indicating the presence of a fault, and a fault conclusion comprising a logical combination of potential fault causes of the fault;

logically combining those fault conclusions whose associated fault condition is met;

determining a logical diagnosis result having at least one fault cause hypothesis, on the basis of the combined fault conclusions;

calculating an occurrence probability for each fault cause hypothesis of the logical diagnosis result.

In one embodiment of the method according to the invention, the fault cause hypotheses are sorted in accordance with the calculated occurrence probabilities and maintenance procedures associated with the fault cause hypotheses are performed in the order of the sorted fault cause hypotheses.

In one embodiment of the method according to the invention, the presence of a fault is detected by a fault detector during flight operation of the flying object.

In one embodiment of the method according to the invention, the order of the sorted fault cause hypotheses, after detection of a fault, is transmitted to a destination airport of the flying object via a radio interface in order to prepare corresponding maintenance procedures.

The invention furthermore provides a computer program for carrying out a method for optimizing maintenance measures in a flying object comprising the following steps:

providing diagnosis rules, which each have a fault condition indicating the presence of a fault, and a fault conclusion comprising a logical combination of potential fault causes of the fault;

logically combining those fault conclusions whose associated fault condition is met;

determining a logical diagnosis result having at least one fault cause hypothesis, on the basis of the combined fault conclusions;

calculating an occurrence probability for each fault cause hypothesis of the logical diagnosis result.

The invention furthermore provides a data carrier, which stores a computer program of this type.

The invention furthermore provides a flying object component of a flying object, in particular of an aircraft, comprising a fault diagnosis device for optimizing maintenance measures in the flying object comprising:

a storage unit for storing diagnosis rules, which each have a fault condition indicating the presence of a fault, and a fault conclusion formed by logical combinations of potential fault causes of the respective fault;

a logic unit, which logically combines those stored fault conclusions whose associated fault conditions are met and, on the basis of the combined fault conclusions, determines a logical diagnosis result having at least one fault cause hypothesis; and comprising a calculation unit, which calculates an occurrence probability for each fault cause hypothesis of the logical diagnosis result.

The invention furthermore provides a flying object, in particular an aircraft, comprising at least one flying object component having a fault diagnosis device for optimizing maintenance measures on the flying object:

a storage unit for storing diagnosis rules, which each have a fault condition indicating the presence of a fault, and a fault conclusion formed by logical combinations of potential fault causes of the respective fault;

a logic unit, which logically combines those stored fault conclusions whose associated fault conditions are met and, on the basis of the combined fault conclusions, determines a logical diagnosis result having at least one fault cause hypothesis; and comprising a calculation unit, which calculates an occurrence probability for each fault cause hypothesis of the logical diagnosis result.

The invention furthermore provides a maintenance device for the maintenance of flying objects at a destination airport comprising:

a radio interface for receiving occurrence probabilities of fault cause hypotheses from a flying object; and comprising a maintenance unit, which prepares maintenance procedures associated with the fault cause hypotheses in accordance with the received occurrence probabilities of fault cause hypotheses and automatically performs them successively after the flying object has landed at the destination airport.

BRIEF DESCRIPTION OF THE FIGURES

Embodiments of the fault diagnosis device according to the invention and of the method according to the invention for optimizing maintenance measures in a flying object are described below with reference to the accompanying figures for elucidating features essential to the invention:

In the figures:

FIG. 6 shows an exemplary embodiment of diagnosis rules in the application example illustrated in FIG. 5;

FIGS. 8A-8C show different representation possibilities for diagnosis knowledge which is used in the method according to the invention for optimizing maintenance measures.

DETAILED DESCRIPTION OF EMBODIMENTS

Figure 1:
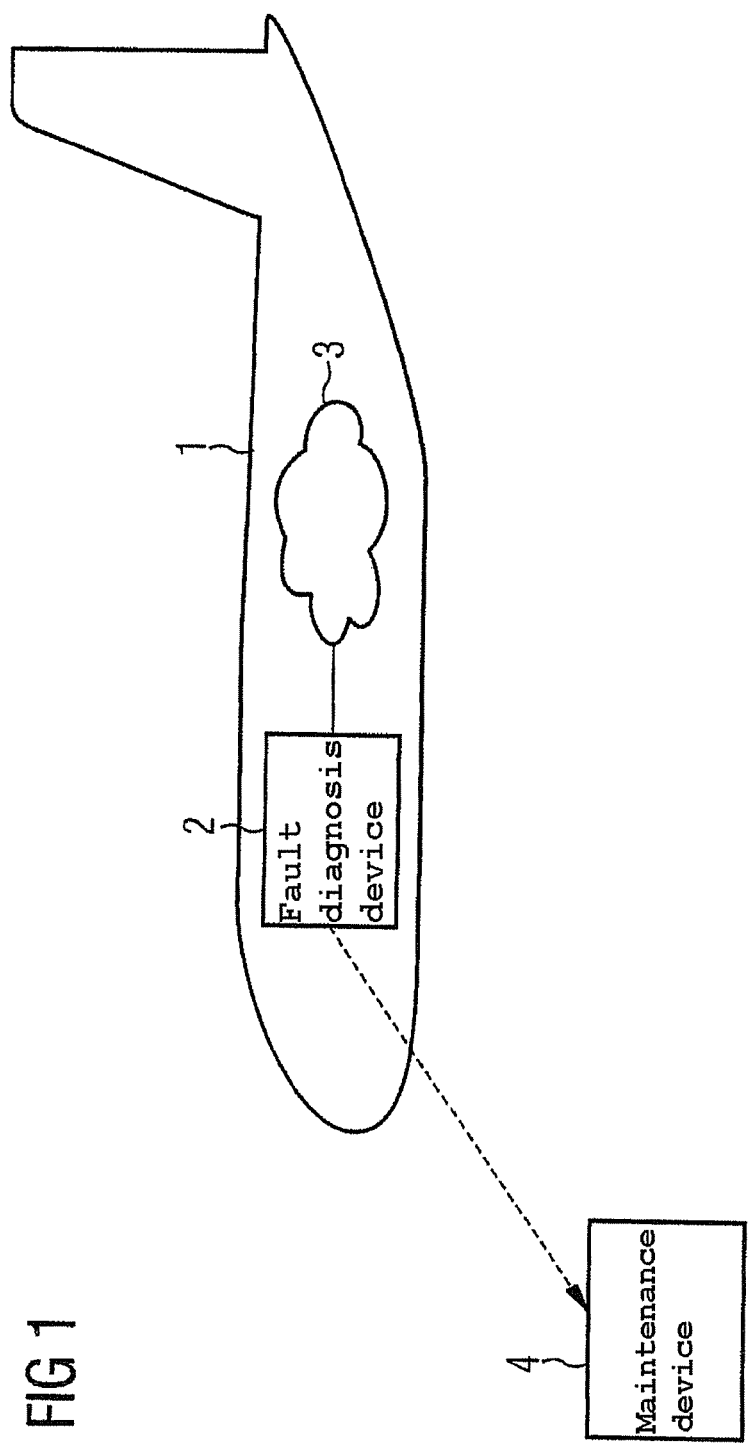
FIG. 1 shows a flying object with a fault diagnosis device according to the invention.

As can be discerned from FIG. 1, a flying object 1, for example a passenger aircraft, contains at least one fault diagnosis device 2 according to the invention for optimizing maintenance measures in the flying object 1. The fault diagnosis device 2 can be connected to further aircraft components of the aircraft 1 via a network 3. The fault diagnosis device 2 has a radio interface in order for example to transmit occurrence probabilities of fault cause hypotheses determined to a maintenance device 4 situated at a destination airport for the aircraft 1, for example.

Figure 2:
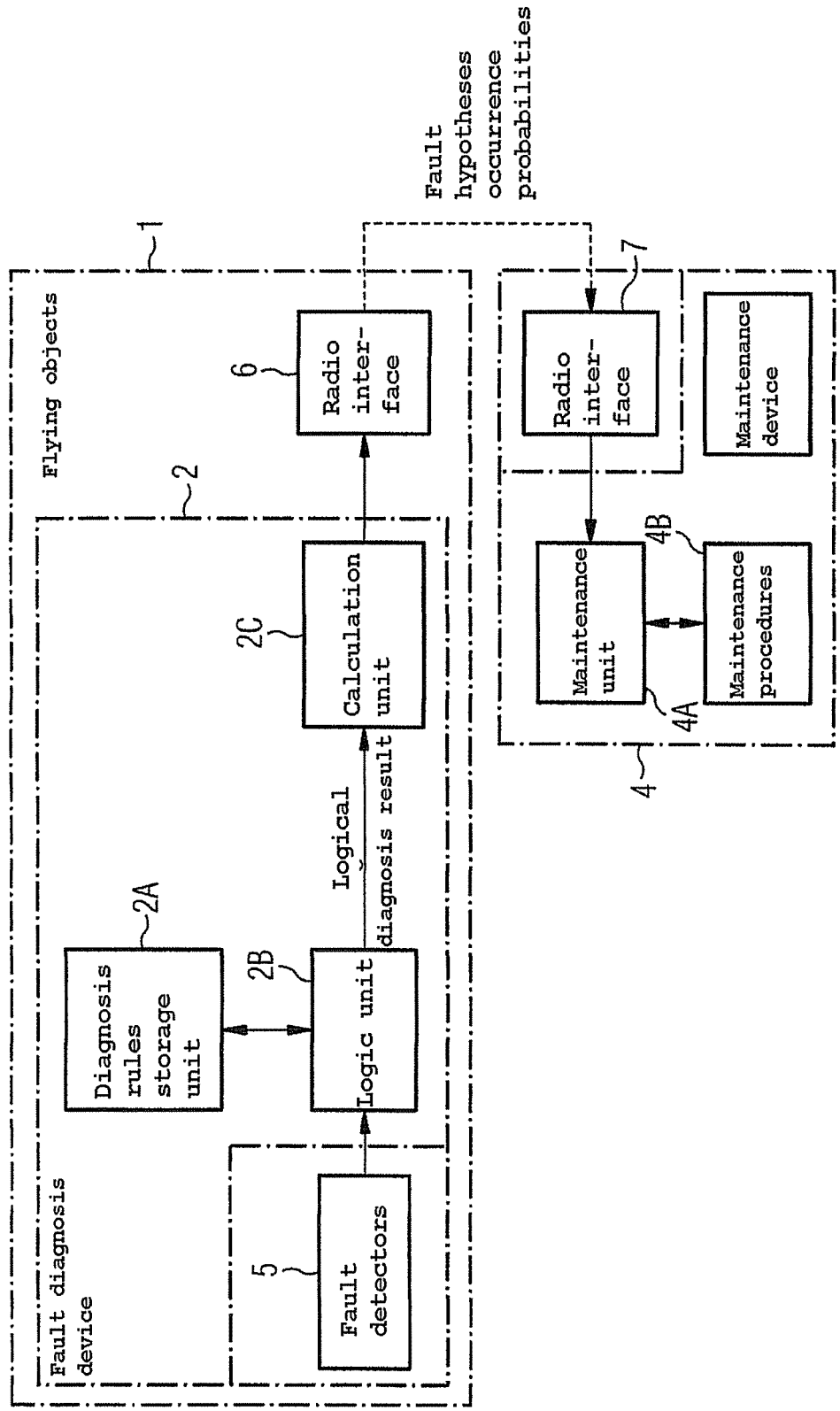
FIG. 2 show a block diagram of a system for optimizing maintenance measures which contains the fault diagnosis device according to the invention.

FIG. 2 shows a block diagram for elucidating the fault diagnosis device 2 according to the invention. The fault diagnosis device 2 receives, from one or a plurality of fault detectors 5, information about whether fault conditions are met by a plurality of aircraft components or whether a fault event has occurred. The fault detectors 5 can be integrated in other aircraft components or form independent aircraft components, for example sensors. The fault diagnosis device 2 contains a storage unit 2a for storing diagnosis rules, which each have a fault condition indicating the presence of a fault, and a fault conclusion formed by logical combinations of potential fault causes of the respective fault.

Furthermore, the fault diagnosis device 2 according to the invention, as is illustrated in FIG. 2, contains a logic unit 2B, which logically combines those stored fault conclusions whose associated fault conditions are met with one another and, on the basis of the combined fault conclusions, determines a logical diagnosis result having at least one fault cause hypothesis. The logic unit 2B supplies the logical diagnosis result to a calculation unit 2C of the fault diagnosis device 2. The calculation unit 2C calculates an occurrence probability for each fault cause hypothesis of the logical diagnosis result. In one possible embodiment, the logic unit 2B logically ANDs the fault conclusions—stored in the memory 2A—of those diagnosis rules whose fault conditions are met. The meeting of a fault condition is reported to the logic unit 2B by the associated fault detector 5. The logic unit 2B thereupon determines the logical diagnosis result automatically by means of predefined Boolean calculation specifications or simplification rules on the basis of the combined fault conclusions of the diagnosis rules. The logical diagnosis result determined contains at least one fault cause hypothesis. The calculation unit 2C subsequently calculates an associated occurrence probability for each fault cause hypothesis of the logical diagnosis result. In one possible embodiment, the occurrence probability is calculated for each fault cause hypothesis on the basis of the individual failure probabilities of the aircraft components combined with one another in the fault cause hypothesis.

In one possible embodiment, the calculation unit 2C sorts the fault cause hypotheses of the logical diagnosis result in accordance with the calculated occurrence probabilities of the respective fault cause hypotheses. In one possible embodiment, the fault cause hypotheses are sorted in a list according to descending occurrence probability, wherein the fault cause hypothesis having the highest occurrence probability occupies the first place in the list.

In the embodiment illustrated in FIG. 2, the flying object, that is to say the aircraft 1, has a radio interface 6. The calculation unit 2C transmits the calculated occurrence probabilities of the fault cause hypotheses of the logical diagnosis result to the maintenance device 4 via the radio interface 6. For this purpose, the maintenance device 4 is likewise connected to a radio interface 7. A maintenance unit 4A successively performs maintenance procedures stored within the maintenance device, said maintenance procedures being stored in a memory 4B and being respectively provided with regard to a fault cause hypothesis of a diagnosis result, in a manner dependent on the calculated occurrence probabilities of the communicated fault cause hypotheses until the reported fault is rectified. In one possible embodiment, the flying object 1, whilst still in flight operation or during the flight, transmits the fault hypotheses with the associated occurrence probabilities via the radio interface 6 to the maintenance device 4 on the ground. Before the aircraft 1 lands, the necessary maintenance procedures are then prepared and, after the flying object 1 has landed, said maintenance procedures are performed automatically until the indicated fault in the affected flight system is rectified. Since the maintenance procedures can already be prepared during flight operation of the aircraft 1, the necessary maintenance times are thereby considerably reduced. The maintenance device 4 can be a portable apparatus that can be connected to the respectively affected flight system via an interface after the aircraft 1 has landed.

In one possible embodiment, each flight system of the aircraft 1 has a dedicated fault diagnosis device 2. In an alternative embodiment, the flying object components of a flight system each have a dedicated integrated fault diagnosis device 2.

A flying object component can be any electrical or electronically monitored structural component which can be subject to the occurrence of a fault. Examples of flying object components are actuators, sensors, data or power lines, data switching units or switching units and also data processing units such as computers or servers, by way of example.

In one possible embodiment, the data content of the storage unit 2A of the fault diagnosis device 2 can be configured via an interface.

Figure 3:
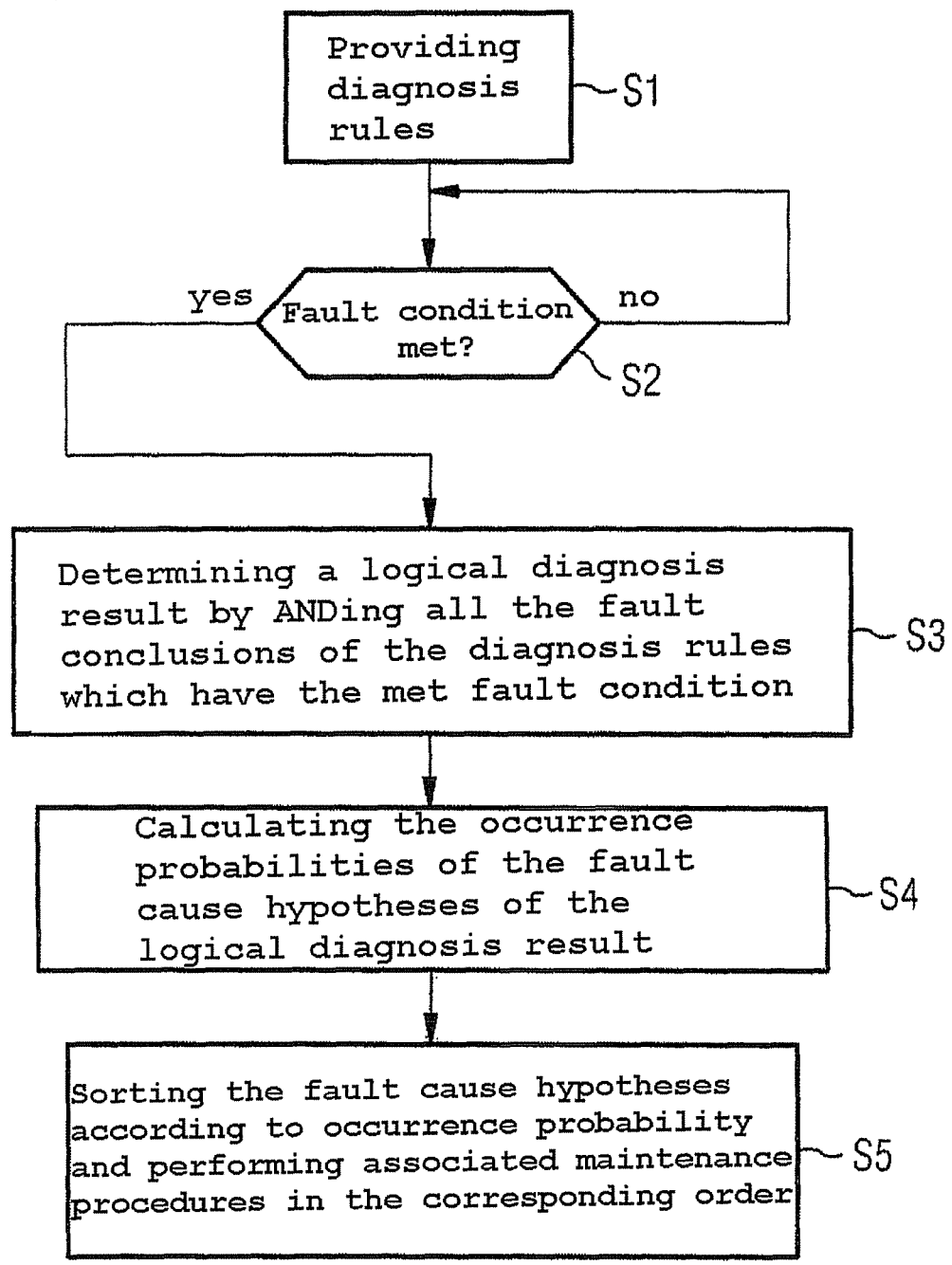
FIG. 3 show a flowchart of a possible embodiment of the method according to the invention for optimizing maintenance measures in a flying object.

FIG. 3 shows a simple flowchart of a possible embodiment of the method according to the invention for optimizing maintenance measures in a flying object 1. In a step S1, firstly elementary diagnosis rules are provided for example by the manufacturer of the respective aircraft components and the storage unit 2A of the fault diagnosis device 2 is correspondingly configured.

Step S2 involves checking the fault conditions, that is to say ascertaining whether one or a plurality of fault conditions of configured diagnosis rules are met, i.e. whether the corresponding fault has occurred.

Each diagnosis rule comprises a fault condition indicating the presence of a fault, and a fault conclusion comprising a logical combination of potential fault causes of the fault.

In one possible embodiment, each potential fault cause has a flying object component and a functional state of said flying object component. If a fault detector 5 reports the meeting of a fault condition or the occurrence of a fault event in step S2, the logic unit 2B of the fault diagnosis device 2 determines a logical diagnosis result in step S3 by ANDing the fault conclusions of those diagnosis rules which have the met fault condition. In this case, a logical diagnosis result having one or a plurality of fault cause hypotheses is determined automatically by the logic unit 2B preferably by means of logical Boolean calculation or compression specifications on the basis of the combined fault conclusions.

Subsequently, in step S4, the calculation unit 2C calculates the occurrence probabilities of all the fault cause hypotheses of the logical diagnosis result. This can be done on the basis of the individual components logically combined with one another in the fault cause hypothesis. If, by way of example, two aircraft components are connected up in series with one another and if the fault cause hypothesis states that both units connected up in series are faulty, the occurrence probability for this fault cause hypothesis is produced by multiplication of the individual fault probabilities of the two units connected up in series.

In a further step S5, the calculation unit 2C sorts the fault cause hypotheses determined in accordance with the magnitude of the calculated occurrence probabilities and transmits these calculation results to the maintenance device 4 via a radio interface, for example. The maintenance device 4 subsequently performs the maintenance procedures stored with regard to the fault cause hypotheses in the corresponding sorted order. In this case, that maintenance procedure which is associated with that fault hypothesis which has the highest occurrence probability is preferably performed first. This has the advantage that the maintenance measure is targeted and uses the most probable fault cause hypothesis as a basis. As a result there is a high statistical probability of the duration for the required maintenance measures being minimized.

The logic unit 2B can be a circuitry-wired logic unit or logic software. The calculation unit 2C is a microprocessor, for example, which, if appropriate, has access to stored individual fault probabilities of flight system components.

Figure 4:
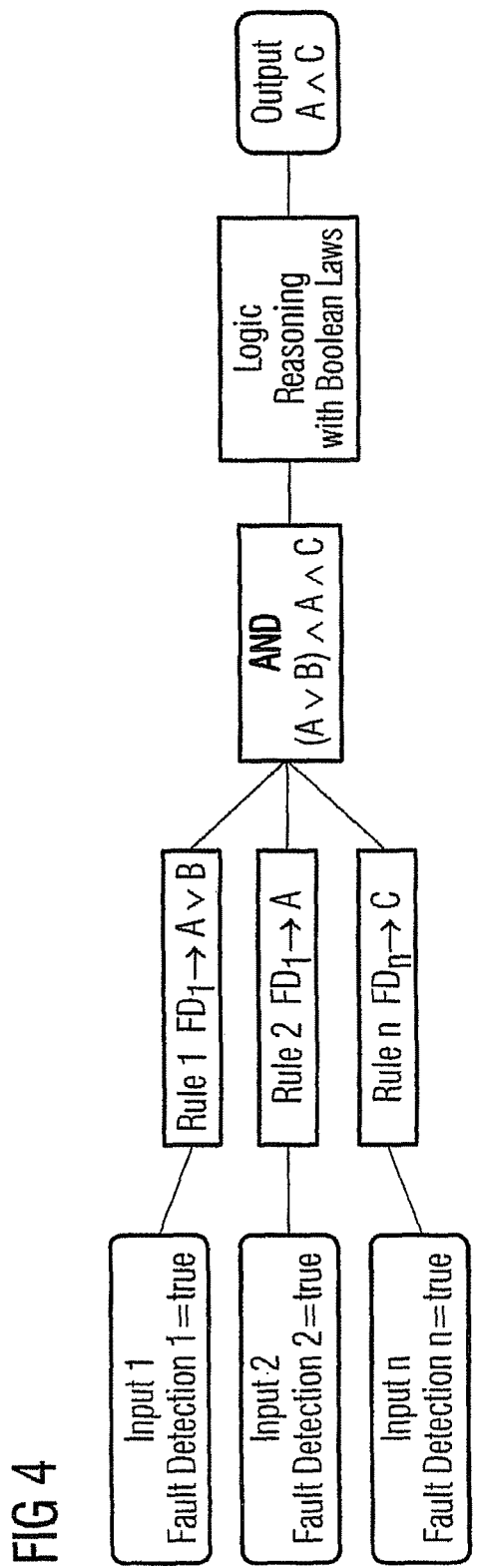
FIG. 4 show s diagram for illustrating a simple example of the method according to the invention for optimizing maintenance measures in a flying object.

FIG. 4 shows a diagram for elucidating the method according to the invention for optimizing maintenance measures. In the example illustrated in FIG. 4, fault detectors 5 indicate the meeting of three fault conditions or the occurrence of N different fault events. For each of these fault conditions, an associated fault conclusion from aircraft components or fault causes that are suspected or are to be taken into consideration is stored in the storage unit 2A. In the example illustrated in FIG. 4, the first fault conclusion, which is formed by logical combinations of potential fault causes of the respective fault, for the fault condition "Fault detection 1 is true" states: "A ∨ B", that is to say that the fault conclusion indicates that the potential fault cause is the flying object component A or the flying object component B.

In the simple example illustrated in FIG. 2, the fault conclusion for the second fault condition "Fault detection 2 is true" states that the potential fault cause is formed by the flying object component A.

In the example illustrated in FIG. 4, the fault conclusion and the N-th fault condition "Fault detection N is true" is the assumption that the flying object component C is faulty.

The logic unit 2B of the diagnosis device 2 logically ANDs those stored fault conclusions whose logical fault conditions are met, as illustrated in FIG. 4. Afterwards, a logical diagnosis result is determined by the logic unit 2B by means of predefined Boolean or compression specifications on the basis of combined fault conclusions and is output to the calculation unit 2C. In the simple example illustrated in FIG. 4, (A ∧ C) is output to the calculation unit 2C as the logical diagnosis result. In the simple example illustrated in FIG. 4, the logical diagnosis result has only one fault cause hypothesis, namely that either the flying object component A or the flying object component C is faulty.

Figure 5:
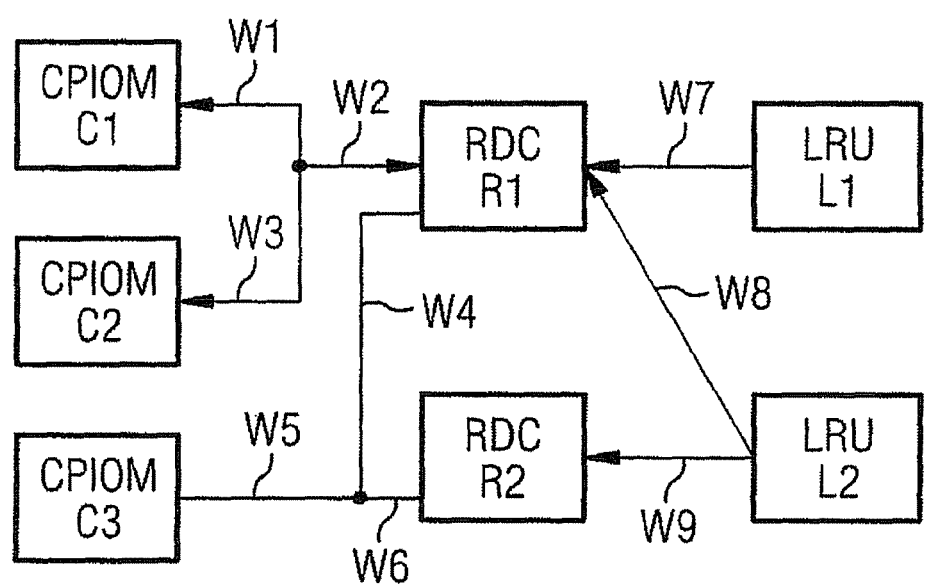
FIG. 5 shows an application example for elucidating the method according to the invention for optimizing maintenance measures in a flying object.

FIG. 5 shows a somewhat more complex application example for elucidating the method according to the invention for optimizing maintenance measures in a flying object 1. In the example illustrated in FIG. 5, a flight system of the aircraft 1 comprises two replaceable components, for example sensors L1, L2 as line replaceable units LRU. These are connected via data lines (wires) W7, W8, W9 to data switching units or remote data concentrators R1, R2. The data concentrator R1 in turn outputs the data via lines W1, W2, W3 to two control computers or central data processing input/output modules (Central Processing Input Output Module) CPIOM C1, C2 provided in parallel. Furthermore, the data concentrator and also the data concentrator R2 are connected via lines W4, W5, W6 to a further CPIOM C3. With regard to such a flight system, corresponding diagnosis rules can be stored in the diagnosis storage unit 2A of the fault diagnosis device 2, as is illustrated by way of example in FIG. 6. An observing unit (Observer), for example a CPIOM or a control computer, executes application programs and observes different fault conditions or elementary fault cases, wherein with regard to each fault condition a fault conclusion is stored in the memory 2A and is formed by logical combinations of potential fault causes of the fault respectively observed. A fault conclusion comprises for example logical combinations of potentially suspect object components of the aircraft 1 which possibly constitute the cause of the fault. In the simple example illustrated in FIG. 6, six different elementary diagnosis rules are stored in the memory 2A.

By way of example, if the CPIOM C1 or control computer C1 illustrated in FIG. 5 observes that it is no longer receiving data from the two sensors L1 and L2, the fault conclusion from the flight components that are to be suspected states: R1 or W1 or W2 or (L1 and L2) or (W2 and W8). If neither of the two sensors L1, L2 is supplying data to the control computer C1 any longer, there is thus the possibility that either the data concentrator R1 or the line W1 or the line W2 is faulty or defective. Furthermore, there is the possibility that both L1 and L2 have failed simultaneously or that the lines W7 and W8 have failed simultaneously.

If the control computer C2 observes that it is no longer receiving data from the sensors L1, L2, there is the possibility that the data concentrator R1 or the line W3 or the line W2 is defective. Furthermore, there is the possibility that both sensors L1, L2 are defective or that both the line W7 and the line W8 are defective.

In this way, different diagnosis rules can be created on the basis of the signal paths present in the flight system and can be stored. In one possible embodiment, a fault conclusion of a diagnosis rule comprises logical combinations of flying object components which lie in a signal path leading to that flying object component which has a fault detector for detecting the fault condition of the respective diagnosis rule. In the example illustrated in FIG. 6, e.g. the control computer C1 has at least one fault detector 5 in order to ascertain whether it is receiving data from the sensors L1, L2. If the fault detector 5 reports the occurrence of the fault condition, the corresponding fault conclusion comprising the logical combination of potential fault causes is read out from the memory 2A.

In one possible embodiment, all fault conclusions whose fault conditions are met are read out and are logically ANDed by the logic unit 2B. In the simple example illustrated in FIG. 6, the logic unit 2B firstly performs logical ANDings of the read-out fault conclusions of the fault conditions that have occurred. In the given example, if all six fault conditions of the diagnosis rules illustrated in FIG. 6 are met, the six different fault conclusions read out are ANDed.

The logical expression states:

(R1 or W1 or W2 or (L1 and L2) or (W7 and W8)) and (R1 or W3 or W2 or (L1 and L2) or (W7 and W8)) and (R1 or L1 or W7 or W4 or W5) and (R1 or W1 or W2) and (R1 or W2 or W3) and (R1 or W4 or W5)

The logic unit 2B subsequently determines, by means of predefined Boolean calculation or compression specifications, the combined logical expression as a logical diagnosis result, having at least one fault cause hypothesis:

R1 or (W2 and W4) or (W2 and W5) or (W1 and W3 and W4) or (W1 and W3 and W5)

In one possible embodiment, the logical diagnosis result is also converted by the logic unit 2B into an EXOR form, in which different fault cause hypotheses are logically linked to one another by means of EXOR combinations.

In the simple example illustrated in FIGS. 5, 6, therefore, one possible fault cause hypothesis given the occurrence of all six fault conditions for the six different diagnosis rules which are stored in the memory 2A states that the data concentrator R1 is defective. A further fault cause hypothesis states that both the line W2 and the line W4 are defective. The third fault cause hypothesis states that both the line W2 and the line W5 are defective. A further fault cause hypothesis is that the line W1, the line W3 and the line W4 are defective. A further fault cause hypothesis of the diagnosis result states that both the line W1 and the lines W3 and W5 are defective.

The different fault cause hypotheses determined have different occurrence probabilities. By way of example, the probability that a plurality of system components have failed simultaneously is generally lower than the probability of an individual system component failing. In one possible embodiment, the calculation unit 2C calculates an occurrence probability for each fault cause hypothesis of the logical diagnosis result determined, wherein the occurrence probability of a fault cause hypothesis is calculated on the basis of the failure probabilities of the individual components.

In one possible embodiment, the calculation unit 2C has access to a table in which the failure probabilities for the different individual flying object components of the respective flight system are stored. By way of example, the failure probability for the data concentrator R1 is 0.1 and the failure probability for the different lines W1-W8 is 0.01 in each case. The occurrence probability for the fault cause hypothesis R1 of the diagnosis result is in this case identical to the failure probability of the component R1, i.e. 0.1.

By contrast, the occurrence probability for the second fault cause hypothesis W2 and W4, that is to say that both the line W2 and the line W4 have failed, is: $0.01 \times 0.01 = 0.0001$ and thus much lower than the occurrence probability for the first fault cause hypothesis. In the example shown in FIG. 6, the logical diagnosis result determined comprises five fault cause hypotheses F1, F2, F3, F4, F5. If the occurrence probability or fault probability for the data concentrator R1 is $10^{-1}$ and the failure probability of each line W is $10^{-2}$, the following occurrence probabilities P arise for the different fault cause hypotheses F as follows:

F1: $10^{-1}$
F2: $10^{-4}$
F3: $10^{-4}$
F4: $10^{-6}$
F5: $10^{-6}$

In this scenario, therefore, the occurrence probability is the highest for the first fault cause hypothesis F1, that is to say that the data concentrator R1 is faulty. The calculation unit 2C transmits the calculated occurrence probabilities of the different fault cause hypotheses, for example of the fault cause hypotheses F1-F5, of the logical diagnosis result via the interface to the maintenance unit 4A, which performs first that maintenance procedure which is provided for the fault cause hypothesis having the highest occurrence probability. In this case, the maintenance unit 4A carries out that maintenance procedure which is provided for the fault cause hypothesis F1. The further maintenance procedures for the further fault cause hypotheses F2-F5 are subsequently performed in accordance with the magnitude of the calculated occurrence probability.

FIGS. 7A-7F show simple examples for elucidating different scenarios. In the example illustrated in FIG. 7A, the flying object component A is faulty, this being observed by the two components B, C. The logical diagnosis result states: A ∧ A=A. This means that a plurality of instances or observations of the same fault causes are reduced by a diagnosis result and, consequently, the observations of different functions to be monitored can be compressed, or observations can be corrected.

Figure 7A:
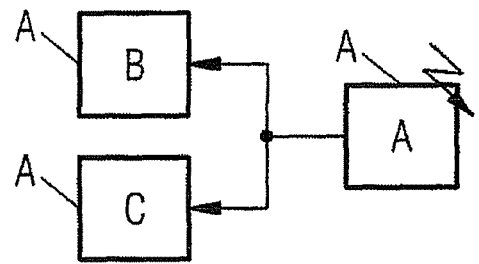
FIGS. 7A-7F show examples for elucidating the method according to the invention for optimizing maintenance measures in a flying object.
Figure 7B:
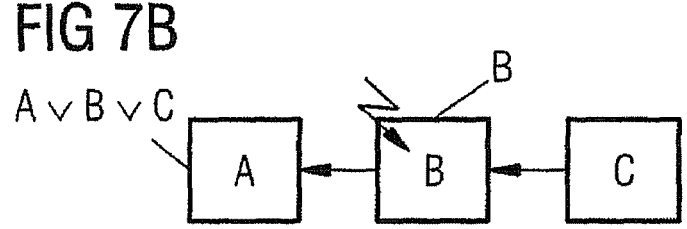

FIG. 7B shows a faulty component B within a series connection, wherein the occurrence of a fault condition is observed by a component A. By way of example, the component A observes the occurrence of a fault with the simple diagnosis rule or fault conclusion (A ∨ B ∨ C) and the component B observes the occurrence of the fault with the diagnosis rule or fault conclusion B.

This produces as diagnosis result: (A ∨ B ∨ C)∧ B=B

Figure 7C:
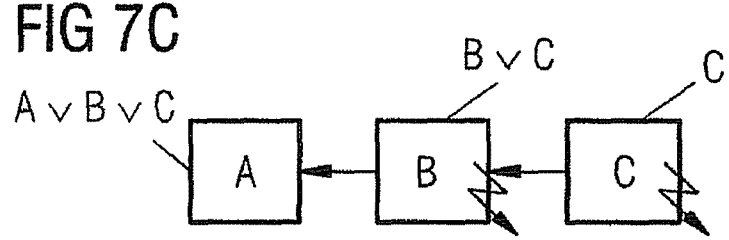

In the example illustrated in FIG. 7C, the component B and also the component C are defective. The component A observes the occurrence of the fault with the corresponding diagnosis rule (A ∨ B ∨ C), the component B observes the fault with the diagnosis rule (B ∨ C) and the component C observes the fault with the diagnosis rule C.

The corresponding diagnosis result states: (A ∨ B ∨ C) ∧ (B ∨ C)∧ (C=C).

Figure 7D:
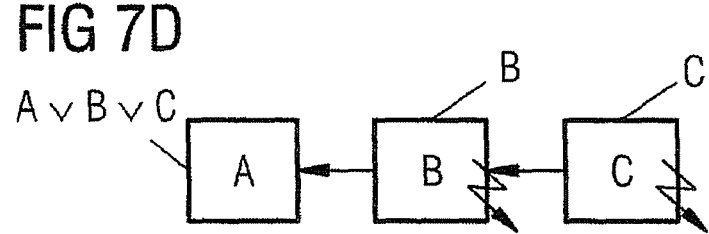

In the example illustrated in FIG. 7D, the components B, C are likewise defective, wherein the component B draws a different fault conclusion according to the corresponding diagnosis rules, namely the conclusion B.

The corresponding logical diagnosis result states: (A∨ B ∨ C)∧ B∧ C=B∧ C

The storage of the fault diagnosis rules, in particular of the associated fault conclusions, can thus have an influence on the fault diagnosis result. Whereas in the case of FIG. 7C the diagnosis result states C, the fault diagnosis result for the case in FIG. 7D is (B ∧ C).

FIGS. 7B, 7C, 7D show the influence of the Boolean adaptation law A ∧ (A ∨ B)=A when determining a fault diagnosis result.

Figure 7E:
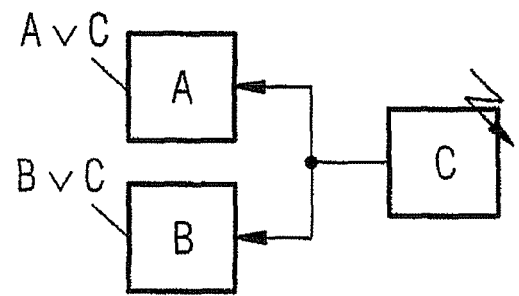

FIG. 7E shows the influence of the Boolean distributive law for determining a diagnosis result: (A ∨ B)∧ (A ∨ C)=A ∨ (B ∧ C).

In the example illustrated in FIG. 7E, a flying object component C is defective, this being observed by the two components A and B (A ∨ B). The fault conclusion of the diagnosis rules in the fault case that has occurred states in the case of the component A: (A ∨ C) and in the case of the component B: (B ∨ C).

The diagnosis result here arises as follows:

(A ∨ C)∧ (B ∨ C)=C ∨ (A ∧ B)

If a fault occurs at the component C, therefore, one fault cause hypothesis states that the component C has actually failed. The alternative fault cause hypothesis states that the two observing components A, B have failed and a double fault is thus present. With the aid of the probabilities of the individual components, it can be verified, for example, that the occurrence probability for the fault cause hypothesis "Failure of the fault component C alone" is more probable.

Figure 7F:
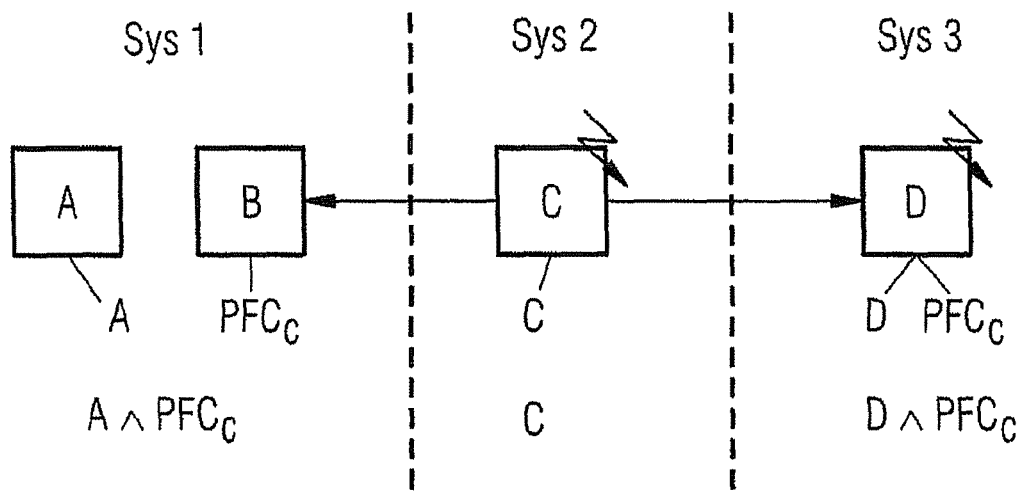

FIG. 7F shows the influence of the Boolean associative law when calculating a fault diagnosis result:

(A ∧ B)∧ C=A ∧ (B ∧ C)

In the examples illustrated in FIG. 7F, three different aircraft systems are considered, which can be connected to one another. The aircraft system Sys1 contains the components A, B, the aircraft system Sys2 contains the component C and the aircraft system Sys3 contains the component D. In the example illustrated in FIG. 7F, the component C and the component D are defective. A fault in the component C in the system Sys2 leads to a predefined fault condition $PFC_C$, which is observed for example by the components B, D of the other systems Sys1, Sys3. The overall diagnosis result of the overall system, comprising the three subsystems Sys1, Sys2, Sys3 thus states:

(A ∧ $PFC_C$) ∧ (C) ∧ (D ∧ $PFC_C$)=A ∧ C ∧ D

It becomes clear on the basis of the example illustrated in FIG. 7F that partial diagnosis results of subsystems can be combined with one another in order to determine a diagnosis result for an overall system.

In one possible embodiment, maintenance procedures TSP (Trouble-Shooting Procedures) are provided for fault causes or groups of fault causes which require the same maintenance measures. In one possible embodiment, an associated maintenance procedure is provided for each fault cause hypothesis.

The diagnosis knowledge or the fault diagnosis rules is/are preferably created on the basis of specifications from the various system manufacturers or made available thereby.

FIGS. 8A, 8B, 8C show different representation possibilities for diagnosis knowledge or a diagnosis database. Diagnosis rules can be represented logically, as illustrated in FIG. 8A, but also graphically, as illustrated in FIG. 8B. Furthermore, diagnosis rules can also be represented in tabular fashion, as illustrated in FIG. 8C, wherein such a configuration table can be stored in a memory 2A, for example.

In the method according to the invention, it is possible to prepare or to provide maintenance procedures of different causes or different fault cause hypotheses which require the same maintenance measures.

The diagnosis method according to the invention for optimizing maintenance measures in an aircraft is able to take account of all possible fault events and event combinations, to combine the possible fault causes in flight operation and to prepare or directly initiate the corresponding maintenance procedures on the basis of the diagnosis result. On account of the possible preparation of the maintenance measures and the targeted preparation of the maintenance procedures firstly for the most probable fault cause hypotheses, the maintenance times are significantly reduced.

The method according to the invention for the diagnosis of fault causes and for optimizing maintenance measures is performed dynamically and automatically during the operational time of the different flight systems. It is therefore also possible to flexibly evaluate fault scenarios not taken into account by a development engineer in the development or design of the respective flight system. The safety of flight operation is additionally increased as a result. The use of Boolean calculation and compression specifications permits a reliable and rapid evaluation of the diagnosis results. The method according to the invention uses logical conclusions in order to deduce possible faulty system components efficiently from fault detections in flight systems.

The invention claimed is:

1. A fault diagnosis device for optimizing maintenance measures in a flying object comprising:
a storage unit for storing diagnosis rules, which each have a fault condition indicating the presence of a fault, and a fault conclusion formed by logical combinations of potential fault causes of the respective fault;
a logic unit, which logically combines those stored fault conclusions whose associated fault conditions are met and automatically determines a logical diagnosis result having at least one fault cause hypothesis by logical Boolean calculation specifications on the basis of the combined fault conclusions of the diagnosis rules; and
comprising a calculation unit, which calculates an occurrence probability for each fault cause hypothesis of the logical diagnosis result based on failure probabilities of individual components stored in a table, wherein the calculation unit transmits the calculated occurrence probabilities of the fault cause hypotheses of the logical diagnosis result to a maintenance device which is arranged on the ground via a wireless interface.

2. The fault diagnosis device according to claim 1, wherein the maintenance device has a maintenance unit, which successively performs maintenance procedures, respectively provided with regard to a fault cause hypothesis of the diagnosis result, in a manner dependent on the calculated occurrence probabilities of the fault cause hypotheses until the fault is rectified.

3. The fault diagnosis device according to claim 1, wherein the calculation unit sorts the fault cause hypotheses of the logical diagnosis result in accordance with the calculated occurrence probabilities of the fault cause hypotheses.

4. The fault diagnosis device according to claim 1, wherein the fault diagnosis device transmits the calculated occurrence probabilities of the fault cause hypotheses to the maintenance device via a radio interface during flight operation of the flying object, said maintenance device being situated at a destination airport of the flying object in order to prepare maintenance measures.

5. The fault diagnosis device according to claim 1, wherein the logic unit logically ANDs the stored fault conclusions of the diagnosis rules with one another.

6. The fault diagnosis device according to claim 1, wherein, in order to meet a fault condition, a diagnosis rule is detected by a fault detector of a flying object component within the flying object.

7. The fault diagnosis device according to claim 6, wherein a diagnosis rule comprises logical combinations of flying object components which lie in a signal path leading to that flying object component which has the fault detector for detecting the fault condition of the diagnosis rule.

8. The fault diagnosis device according to claim 1, wherein for each fault cause hypothesis at least one associated maintenance procedure (TSP) is present, comprising a plurality of maintenance measures.

9. The fault diagnosis device according to claims 2, 8, wherein the maintenance procedures (TSP) are performed by the maintenance unit in the order of the sorted occurrence probabilities of the associated fault cause hypotheses.

10. The fault diagnosis device according to claim 7, wherein the potential fault causes each have a flying object component and a functional state of said flying object component.

11. The fault diagnosis device according to claim 6, wherein the flying object components of the flying object have actuators, sensors, lines, data switching units and data processing units.

12. A method for optimizing maintenance measures in an object of an aircraft or spacecraft comprising the following steps:
providing diagnosis rules from a storage unit to a logic unit, wherein each of the diagnosis rules have a fault condition indicating the presence of a fault, and a fault conclusion comprising a logical combination of potential fault causes of the fault;
receiving information at the logic unit from one or more fault detectors about whether fault conditions are met or whether a fault event has occurred;
in the logic unit, logically combining those fault conclusions whose associated fault condition is met according to the information received from the fault detectors in order to automatically determine a logical diagnosis result having at least one fault cause hypothesis by logical Boolean calculation specifications on the basis of the combined fault conclusions of the diagnosis rules;
calculating an occurrence probability for each fault cause hypothesis of the logical diagnosis result determined based on failure probabilities of individual components stored in a table; and
transmitting, the calculated occurrence probabilities of the fault cause hypotheses of the logical diagnosis result to a maintenance device which is arranged on the ground via a wireless interface.

13. The method according to claim 12, wherein the fault cause hypotheses are sorted in accordance with the calculated occurrence probability and maintenance procedures associated with the fault cause hypotheses are performed in the order of the sorted fault cause hypotheses.

14. The method according to claim 12, wherein the presence of a fault is detected by the one or more fault detectors during operation of the object, in particular of a flying object.

15. The method according to claim 14, wherein the order of the sorted fault cause hypotheses, after detection of a fault, is transmitted to a destination airport of the flying object via a radio interface in order to prepare corresponding maintenance procedures.

16. A computer program embodied in a non-transitory computer readable medium, the computer program being configured for carrying out a method comprising:
providing diagnosis rules from a storage unit to a logic unit, wherein each of the diagnosis rules have a fault condition indicating the presence of a fault, and a fault conclusion comprising a logical combination of potential fault causes of the fault;
receiving information at the logic unit from one or more fault detectors about whether fault conditions are met or whether a fault event has occurred;
in the logic unit, logically combining those fault conclusions whose associated fault condition is met according to the information received from the fault detectors in order to automatically determine a logical diagnosis result having at least one fault cause hypothesis by logical Boolean calculation specifications on the basis of the combined fault conclusions of the diagnosis rules;
calculating an occurrence probability for each fault cause hypothesis of the logical diagnosis result determined based on failure probabilities of individual components stored in a table; and
transmitting the calculated occurrence probabilities of the fault cause hypotheses of the logical diagnosis result to a maintenance device which is arranged on the ground via a wireless interface.

17. A flying object component comprising an electrical or electronically monitored structural component, the flying object component comprising the fault diagnosis device according to claims 1 to 11.

18. A flying object comprising at least one flying object component According to claim 17.

* * * * *